(12) United States Patent
Scheidt et al.

(10) Patent No.: US 8,083,808 B2
(45) Date of Patent: Dec. 27, 2011

(54) CONTAINER SECURITY

(75) Inventors: Edward M. Scheidt, McLean, VA (US);
C. Jay Wack, Clarksburg, MD (US);
Wai Lin Tsang, Falls Church, VA (US)

(73) Assignee: TecSec, Inc., Herndon, VA (US)

( * ) Notice: Subject to any disclaimer, the term of this patent is extended or adjusted under 35 U.S.C. 154(b) by 1201 days.

(21) Appl. No.: 11/777,119

(22) Filed: Jul. 12, 2007

(65) Prior Publication Data

US 2008/0052538 A1 Feb. 28, 2008

Related U.S. Application Data

(60) Provisional application No. 60/807,128, filed on Jul. 12, 2006.

(51) Int. Cl.
*G08B 29/04* (2006.01)

(52) U.S. Cl. .......... 726/35; 713/176; 713/193; 713/194; 726/34; 340/5.6; 340/5.73; 340/5.81

(58) Field of Classification Search .............. 726/34–35; 713/176, 189, 194; 340/5.6–5.81
See application file for complete search history.

(56) References Cited

U.S. PATENT DOCUMENTS

| | | | |
|---|---|---|---|
| 6,420,971 B1 * | 7/2002 | Leck et al. | 340/542 |
| 7,061,399 B2 * | 6/2006 | Leck | 340/870.06 |
| 2001/0011353 A1 * | 8/2001 | Little et al. | 713/200 |
| 2004/0025039 A1 * | 2/2004 | Kuenzi et al. | 713/193 |
| 2005/0062344 A1 * | 3/2005 | Holt et al. | 303/7 |
| 2007/0171060 A1 * | 7/2007 | Trent et al. | 340/568.1 |

* cited by examiner

*Primary Examiner* — Yin-Chen Shaw
(74) *Attorney, Agent, or Firm* — IP Strategies

(57) ABSTRACT

A container security device includes a housing, electronic circuitry, and cabling. The electronic circuitry is disposed within the housing, and includes first and second microprocessor functions and an interface for accepting and providing data. The cabling is removably coupled to the housing, provides the only communicative coupling between the first microprocessor function and the second microprocessor function, and is adapted to be attached to a container latch so as to break the communicative coupling if the latch is opened. The housing includes a port for the electronic circuitry interface. A method of providing container security includes closing a container using a latch device and removably coupling the cabling to the housing so that the communicative coupling is broken if the latch is opened, providing the only communicative coupling between the first microprocessor function and the second microprocessor function.

9 Claims, 2 Drawing Sheets

CONTAINER SECURITY

CROSS-REFERENCE TO RELATED APPLICATION

This is related to, and claims the benefit under 35 USC §119(e) of U.S. Provisional Application for Patent No. 60/807,128, which was filed on Jul. 12, 2007.

FIELD OF THE INVENTION

The present invention relates to security of physical containers.

BACKGROUND OF THE INVENTION

Transnational shipping containers are used to move bulk goods from one shipping port to another and can be stored for long periods of time. The security for these containers is always a concern since their goods can have very high value or may pose a threat to the safety of the country. Each container is assigned a unique International Organization of Standardization (ISO) number to maintain administrative control for the container. The number is printed on the container in one or more locations in letters that can be readily read from a distance. A barcode can be assigned to the container number and included with the printed number. Each container has only one entrance or opening that includes a locking mechanism that can be further locked with an ancillary device.

BRIEF SUMMARY OF THE INVENTION

A container security device includes a housing, electronic circuitry, and cabling. The electronic circuitry is disposed within the housing, and includes first and second microprocessor functions and an interface for accepting and providing data. The cabling is removably coupled to the housing, provides the only communicative coupling between the first microprocessor function and the second microprocessor function, and is adapted to be attached to a container latch so as to break the communicative coupling if the latch is opened. The housing includes a port for the electronic circuitry interface. The container security device can include the container latch, but preferably is a self-contained device that is separate from the latch or other locking hardware.

The electronic circuitry can be adapted to receive an event credential, a cryptographic key, and initial plaintext data via the electronic circuitry interface. The electronic circuitry can be adapted to store the event credential, the cryptographic key, and the initial plaintext data for access by the first microprocessor function such that the second microprocessor function does not have access to the event credential, the cryptographic key, and the initial plaintext data. The first microprocessor function can be adapted to encrypt the initial plaintext data using the cryptographic key according to the event credential to produce encrypted data.

The second microprocessor function can be adapted to receive an unlock signal via the electronic circuitry interface and to read the encrypted data via the cabling in response to the unlock signal. The electronic circuitry can be adapted to store the encrypted data such that the encrypted data cannot be accessed by the second microprocessor function until the unlock signal is received. The electronic circuitry also can be adapted to modify the encrypted data when an open circuit condition exits in the cabling, as an indication that the cabling was tampered with prior to a valid unlocking procedure. The second microprocessor function can be adapted to provide the encrypted data via the electronic circuitry interface.

A container security system can include the container security device described above, and at least one portable computing device that is adapted to provide the event credential, the cryptographic key, and the initial plaintext data to the container security device via the electronic circuitry interface and to receive the encrypted data from the second microprocessor function via the electronic circuitry interface. The at least one portable computing device can be adapted to decrypt the encrypted data using the cryptographic key according to the event credentials, to provide unlock plaintext data. The portable computing device can be adapted to compare the initial plaintext data with the unlock plaintext data to provide a comparison result, and to generate a validation signal if the comparison result is favorable. The container security device can be adapted to receive the validation signal and to decouple the cabling from the housing only if the comparison result is favorable. The portable computing device can include visual indicia of the comparison result.

According to another aspect of the invention, a method of providing container security includes closing a container using a latch device. Electronic circuitry is provided, disposed within a housing. The electronic circuitry includes first and second microprocessor functions and an interface for accepting and providing data. Cabling that is removably coupled to the housing is also provided. This cabling provides the only communicative coupling between the first microprocessor function and the second microprocessor function, and is adapted to be attached to the latch device so as to break the communicative coupling if the latch is opened.

The method can also include providing the electronic circuitry with an event credential, a cryptographic key, and initial plaintext data, and storing the event credential, the cryptographic key, and the initial plaintext data in the electronic circuitry for access by the first microprocessor function such that the second microprocessor function does not have access to the event credential, the cryptographic key, and the initial plaintext data. The first microprocessor function can encrypt the initial plaintext data using the cryptographic key according to the event credential, to produce encrypted data.

The method can also include providing an unlock signal to the second microprocessor function via the electronic circuitry interface and reading the encrypted data by the second microprocessor function via the cabling in response to the unlock signal. The electronic circuitry can store the encrypted data such that the encrypted data cannot be accessed by the second microprocessor function until the unlock signal is received. The encrypted data can be modified when an open circuit condition exits in the cabling. The encrypted data can be provided by the second microprocessor function via the electronic circuitry interface.

At least one portable computing device can be used to provide the event credential, the cryptographic key, and the initial plaintext data to the container security device via the electronic circuitry interface and to receive the encrypted data from the second microprocessor function via the electronic circuitry interface. The at least one portable computing device can decrypt the encrypted data by the using the cryptographic key according to the event credentials, to provide unlock plaintext data.

The portable computing device can compare the initial plaintext data with the unlock plaintext data to provide a comparison result, and can generate a validation signal if the comparison result is favorable. The electronic circuitry can receive the validation signal and decouple the cabling from the housing only if the comparison result is favorable. Visual indicia of the comparison result can also be provided.

DETAILED DESCRIPTION OF THE INVENTION

Figure 1:
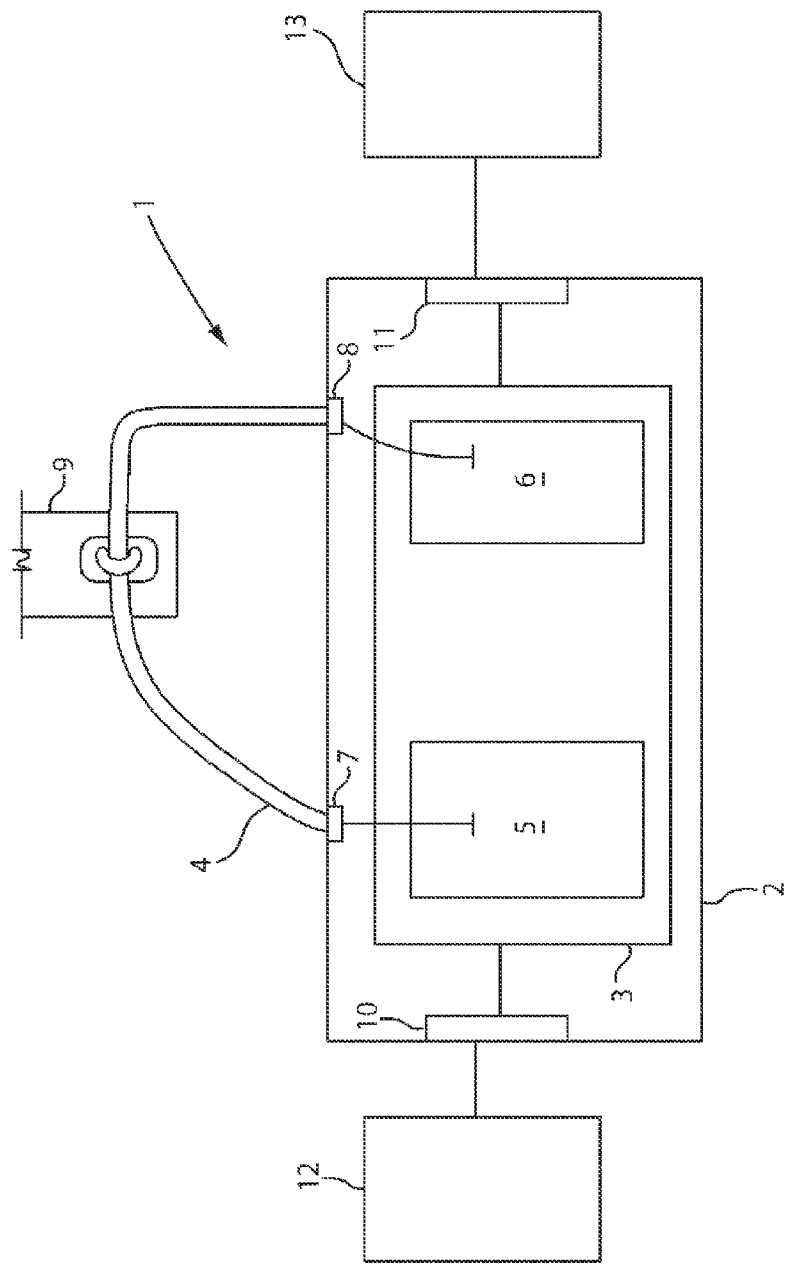
FIG. 1 is a schematic diagram showing an exemplary embodiment of the container security device and system of the invention.

The present invention relates to security of physical containers. The scope of the invention includes all types of containers that are used for any purpose. For ease of explanation, the invention will be described in terms of an embodiment used particularly for a shipping container. The invention is not limited to this particular embodiment, and is intended to cover security of any type of container. Further, constructive key management (CKM) is designated as a suitable encryption scheme for use with the present invention. However, it is contemplated that any encryption scheme having suitable qualities as described herein can be used as the encryption component of the present invention, which accordingly is not limited to CKM only. A more complete description of the CKM encryption scheme can be found at, for example, ANSI X9.69, which is incorporated herein in its entirety. An RFID capability is also described herein. It is contemplated that any RFID solution can be used in connection with the present invention, including, in whole or in part, the RFID scheme described in U.S. Pat. No. 6,229,445, the disclosure of which is incorporated herein in its entirety.

The present invention provides two exemplary solutions for addressing the overall security for the container. Either solution can be used independently, or both can be used together, and either can be modified within the spirit and scope of the invention, as will be apparent to those of skill in the art. Each solution provides a different perspective on providing the container's security.

First Exemplary Solution

An Untethered Secure Augmented Crypto Enforced Tracking (USACET) container lock is a self-contained device that includes a housing, electronics, and cabling to attach to the appropriate place on the container locking mechanism and includes an initiator to activate the container lock. The container locking mechanism includes the following elements.

An insulated, rugged, cabling element for transmitting an electrical signal is installed between two electronic devices contained in a rugged housing with an electronic interface for accessing the two electronic devices.

Two microprocessor functions are used to manipulate code that contains data associated with the container, such as the ISO container number, and an encryption process (for example, CKM) with pre-positioned encryption values. One microprocessor function is used as an encryption processor and the second microprocessor function for manipulating the data. The container ISO number, for example, can be used as one credential (encryption value) and owner and/or other identifying information, for example, can be used as a second (or another of multiple) credential(s). The cable is mechanically installed to connect the two microprocessor functions, which can be embodied in one or more processors, and to complete an electrical circuit as well as provide a communications path between the processor(s).

Optionally, an RF-interfaced microprocessor (RFID) can be included in addition to the other microprocessor functions to facilitate data transfer at various points in the container's life cycle, to augment or even act as an alternate point of communication between the device and respective users, for initialization, validation and certification of the codes; their sequencing, integrity, confidentiality, and differential access to, any or all of the above. Such a microprocessor would require supporting hardware, such as a transmitter and/or receiver, antenna, and necessary software and/or firmware. The conditions for handling and storing each of the containers include rough handling (shock and vibration), extreme weather conditions, salt water, and other factors that can be attributed to large bulky items stored under multiple conditions. Preferably, the housing for the locking device is rated to withstand at least the same conditions as the container.

A Global Positioning System (GPS) RFID device can be included in the USACET device to electronically connect to one of the microprocessors to notate the location and time an opening event took place. A GPS can include a satellite service to give a real time reading of an event such as initialization, disturbance, alteration, be they legitimate or not. This notation and associated data can be stored in the PDA device described below.

A battery, fuel cell, or other power source to maintain power to the processors and GPS device can be included in the housing.

A PDA or equivalent device such as a smart phone or other portable computing device is used to activate the container locking mechanism through a software application that can provide CKM credentials, the CKM combiner, other initialization, and personalization data and short data text for encryption. The PDA can be augmented with an ancillary reader capability to read and write to the electronic processors and GPS through an ISO smart card interface, USB, Firewire or other similar interface. The reader is designed to electronically interface with the locking mechanism interface either physically or through a transmitted signal. If necessary for wireless communication with the PDA, the electronic circuitry of the USACET will include an antenna, transmitter/receiver hardware, and any other necessary hardware, software, and firmware. Wireless communication between the PDA and USACET preferably is encrypted and/o sent over a secure channel.

A general embodiment of this first exemplary solution is shown schematically in FIG. 1. As shown, the container security device 1 includes a housing 2, electronic circuitry 3 disposed within the housing 2, and cabling 4 that is removably coupled to the housing 2. The electronic circuitry 3 includes a first microprocessor function 5 and a second microprocessor function 6 and an interface 10 for accepting and providing data. The cabling 4 is coupled to the housing 2 at ports 7, 8 that provide communicative coupling between the ends of the cabling 4 and the electronic circuitry 3, either directly or indirectly providing communication between the respective ends of the cabling 4 and the first and second microprocessor functions 5, 6. The first and second microprocessor functions 5, 6 are electrically and communicatively isolated from each other in the electronic circuitry 3, such that the cabling 4, when coupled to the housing 2, provides the only communicative coupling between the first microprocessor function 5 and the second microprocessor function 6.

Once the container is closed and latched, the cabling 4 is passed through a latch 9 on the container closure such that the latch and container cannot be opened without removing the cabling 4. The cabling 4 is then connected to the ports 7, 8. Once connected, the cabling provides a communications path between the first and second microprocessor functions 5, 6. Thereafter, if the cabling is removed from either port 7, 8 in order to open the latch 9, communication between the microprocessor functions 5, 6 is broken.

The electronic circuitry 3 receives an event credential, a cryptographic key, and initial plaintext data via the electronic circuitry interface 10. This information can be received at the interface 10 via direct hardware connection to the provider of the information, or the interface 10 can be a wireless interface that receives the information wirelessly. In either case, the interface 10 is a type known to those of skill in the art that exchanges information according to known protocols. The event credential, the cryptographic key, and the initial plaintext data are stored on the electronic circuitry for access by the first microprocessor function 5. The second microprocessor function 6 does not have access to the event credential, the cryptographic key, and the initial plaintext data directly from storage on the electronic circuitry 3. The first microprocessor function 5 encrypts the initial plaintext data using the cryptographic key according to the event credential to produce encrypted data. The encrypted data is then stored on the electronic circuitry 3 such that it is not directly accessible by the second microprocessor function 6.

When the container is to be opened, the second microprocessor function 6 receives an unlock signal via the electronic circuitry interface (shown as a separate interface 11, but which can be the same as the first interface 10). In response to the unlock signal, the second microprocessor function 6 reads the encrypted data via the cabling 4. The encrypted data is provided via the cabling 4 to the second microprocessor function 6 by the first microprocessor function 5, which retrieves the encrypted data from storage. The microprocessor functions 5, 6, can be programmed such that the first microprocessor function 5 will only provide the encrypted data to the second microprocessor function 6 in response to a valid request via the cabling 4. This request can be required to include all or part of the unlock signal or data derived from the unlock signal according to a predetermined function. Alternatively, the first microprocessor function 5 can receive the unlock signal via the interface 10, and in response can "push" the encrypted data to the second microprocessor function 6 via the cabling 4. On receipt of the encrypted data, the second microprocessor function 6 provides the encrypted data via the electronic circuitry interface 11.

Regardless of the mode of communication during an unlock process, the electronic circuitry 3 will store the encrypted data and will not allow access to the encrypted data by the second microprocessor function 6 until the unlock signal is received. In order to provide a record of any tampering with the container security device, the electronic circuitry 3 will modify the encrypted data when an open circuit condition exits in the cabling 4 prior to a valid unlocking procedure. For example, if the cabling connection is broken at a port 7, 8 prior to receipt of a valid unlock signal, an open circuit in the cabling 4 is sensed by the electronic circuitry 3 and the encrypted data can be erased or permanently modified to a predetermined state that indicates tampering with the cabling. The circuitry 3 preferably includes an internal clock, and the form of the modified encrypted data can include an indication of the time that the tampering took place.

An exemplary container security system according to the invention includes the container security device 1 described above, and at least one portable computing device 12, 13. A locking portable computing device 12 provides the event credential, the cryptographic key, and the initial plaintext data to the container security device 1 via the electronic circuitry interface 10 when the container is locked. Likewise, an unlocking portable computing device 13 receives the encrypted data from the second microprocessor function via the electronic circuitry interface 11.

The unlocking portable computing device 13 decrypts the encrypted data using the cryptographic key according to the event credentials, to provide unlock plaintext data. The unlocking portable computing device 13 compares the initial plaintext data with the unlock plaintext data to provide a comparison result, and to generate a validation signal if the comparison result is favorable, which is an indication that the container lock has not been tampered with. Preferably, the container security device 1 receives the validation signal and decouples the cabling 4 from the housing 2 at the ports 7, 8 only if the comparison result is favorable.

The unlocking portable computing device 13 can also include visual indicia of the comparison result, such as an LED that provides a color-coded indication of the result, or a display that provides alphanumeric data, such as the validation result and optional data such as locking information (time and place, as provided by a GPS capability) and information regarding detected tampering (time and place, as provided by a GPS capability).

The locking portable computing device 12 and the unlocking portable computing device can be designed as devices dedicated only for locking and unlocking, respectively, or a single device can be used to perform both functions, available at shipping locations to perform both locking and unlocking functions as containers are shipped and received. It is contemplated that off-the-shelf devices such as PDAs and tablet computers can be modified, programmed, or otherwise adapted to function as the portable computing device(s) of the invention.

Usage Scenario

To activate the security features of the first exemplary embodiment, the USACET lock and PDA are brought to the container's site when the container is ready to be secured. Once the container door is closed and latched, the USACET cable is fed through the locking mechanism latch and is physically connected to the USACET housing and its electronic devices. The container ISO number or other data is entered into the PDA to create a unique variable that contributes to the generation of an event credential (cryptographic value). Reference data associated with the container is entered into the PDA to be used as textual data for encryption, which can be, but is not necessarily, used to provide added entropy to the cryptographic process. The PDA device is electronically connected (via any chosen interface) to the USACET locking mechanism to load/initiate the cryptographic working key into one microprocessor function and an activation indicator is sent to that processor.

The second microprocessor function is used to read the encrypted data to confirm that the USACET locking mechanism had not been tampered (or reveal that tampering occurred) as well as a confirmation of the overall cryptographic exchanges. Decryption of the data, validation of integrity, and certification of its status as unchanged/unaltered, are done on the PDA-like device at the receiving site for the container. Once the data is confirmed, the cable is severed to remove the USACET lock. If a GPS device is included in the USACET locking device, the receiving site's PDA can confirm the location of the container and time that the container was opened for audit purposes (the other value for the GPS capability is if the container is opened during transit.).

Figure 2:
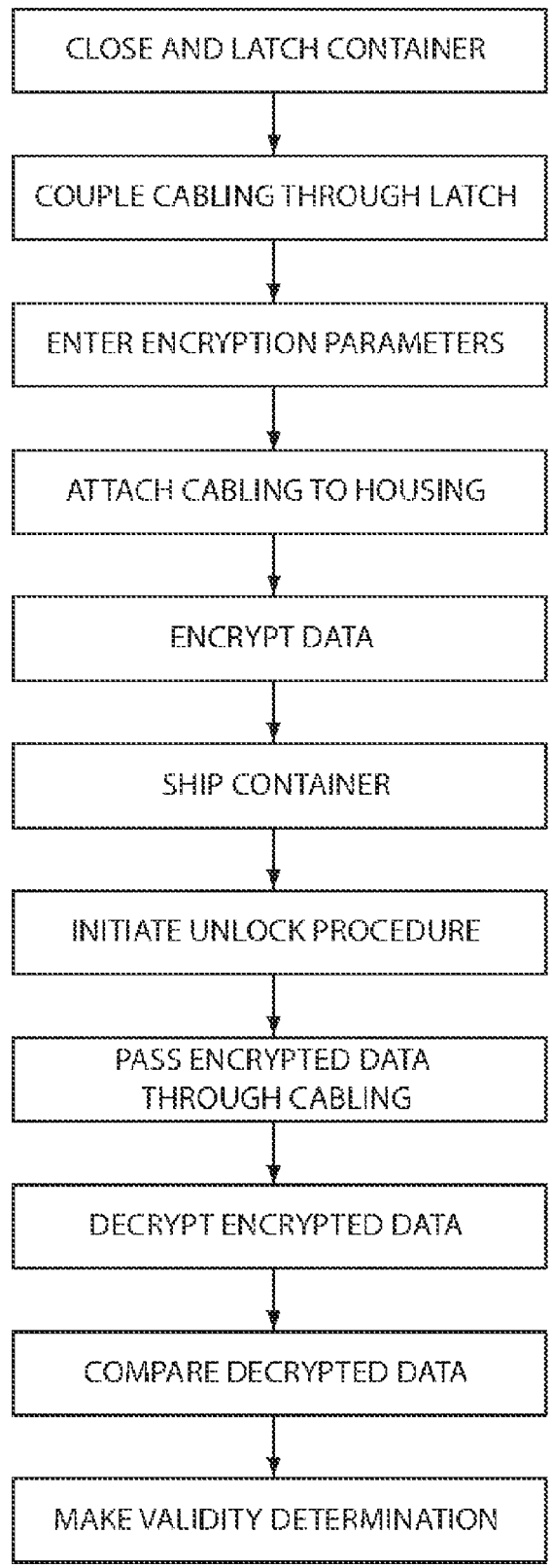
FIG. 2 is a flow diagram showing an exemplary method of the invention.

A general flow diagram of this process is shown in FIG. 2. As shown, the container is first closed and latched using a conventional latching device 9. The cabling 4 of the container security device 1 is attached to the latch device such that the cabling 4 would have to be removed in order to open the latch 9. The cabling 4 is then attached to the housing 2 by coupling the cabling 4 to the ports 7, 8.

The portable computing device 12 provides the electronic circuitry 3 of the container security device 1 with an event credential, a cryptographic key, and initial plaintext data, which are stored in the electronic circuitry 3 for access by the first microprocessor function 5. The first microprocessor function 5 then encrypts the initial plaintext data using the cryptographic key according to the event credential, to produce encrypted data. It is contemplated that different embodiments of the invention will require that the encrypted data be generated either before or after the cabling 4 is coupled to the housing 2. Once the cabling 4 has been secured, the container can be shipped.

At the destination, an unlock signal is provided to the first or second microprocessor function 5, 6 via the electronic circuitry interface 11 and the encrypted data is read by the second microprocessor function 6 via the cabling 4 in response to the unlock signal. As discussed above, different protocols and schemes can be specified for the process of getting the encrypted data to the second microprocessor function 6. The second microprocessor function 6 then provides the encrypted data to the portable computing device 13 via the electronic circuitry interface 11. The portable computing device 13 decrypts the encrypted data by the using the cryptographic key according to the event credentials, to provide unlock plaintext data, which is compared with the initial plaintext data to provide a comparison result. The portable computing device 13 generates a validation signal if the comparison result is favorable, and provides a non-validation indication if the comparison result is not favorable. A favorable comparison result could be an indication that the unlock plaintext data matches the initial plaintext data. It is contemplated that alternative embodiments would instead require that the two plaintext values be related in a predetermined fashion rather than just to require a simple match. Preferably, the portable computing device 13 provides the electronic circuitry 3 with the validation signal via the interface 11, in response to which the electronic circuitry 3 allows the decoupling of the cabling 4 from the housing 2.

Second Exemplary Solution

A USACET electronic seal utilizes a security technique with a mobile picture phone to securely capture a picture of the container ISO number and a separate picture of the container locking mechanism (with or without a USACET locking device). The ISO number and the container locking mechanism will probably not be close enough to be visible for a single captured picture.

The USACET electronic seal includes:
1) A mobile picture phone that can transmit and receive pictures through an e-mail or equivalent exchange and messaging functionality using an existing phone carrier service.
2) A server software application that can process and distribute the pictures with text that is associated with a picture.
3) A collection of unique data is assembled and processed by the cell phone, transmitted, and verified at the server software application.
4) The unique data consists of the following:
   a. The cell phone number from the phone that is taking the picture.
   b. The cell phone hardware number.
   c. The ISO number of the container that is correlated to the container picture.
   d. If a GPS capability is available, the latitude, longitude, altitude, and time can be included as unique data.
5) The unique data is processed on the cell phone by mathematically having a non-linear transformation of all of the available unique data. The resultant number is transmitted with the associated picture.
6) The transmitted picture and associated resultant data is received by the server software application to be further processed. A reverse process of the resultant data into unique data is initially performed. The reverse process reassembles the unique data in the same sequence as the unique data originally was assembled at the camera phone.
7) Any of the unique data or all of the unique data may be confirmed by comparing known data such as the cell phone number and cell phone hardware number, and comparing the ISO number in the picture with the ISO number of the unique data. If the GPS is available, that unique data would indicate where the container picture was taken which could be correlated with other know information about the container.
8) The unique number or unique numbers associated with the container picture may be used for audit at a later time.

Usage Scenario

A picture by a cell phone of the container number (with an equivalent bar code, if available) and/or of the USACET container lock is included with the processed unique data associated with the event. The collection of unique data and a subsequent non-linear transformation of the unique data provides the entropy and security for transmission. The resultant picture and data is e-mailed or otherwise electronically forwarded in a format that can be recognized by a server connected to the Internet or other networking connectivity. The picture and data is received at the server and processed for storage or for further dissemination.

We claim:

1. A container security system, comprising:
a container security device comprising:
a housing;
electronic circuitry; and
cabling;
wherein the electronic circuitry is disposed within the housing, and includes first and second microprocessor functions and an interface for accepting and providing data;
wherein the cabling is removably coupled to the housing, provides an only communicative coupling between the first microprocessor function and the second microprocessor function, and is adapted to be attached to a container latch so as to break the communicative coupling if the latch is opened;
wherein the housing includes a port for the electronic circuitry interface;
wherein the electronic circuitry is adapted to receive an event credential, cryptographic key, and initial plaintext data via the electronic circuitry interface;
wherein the electronic circuitry is adapted to store the event credential, the cryptographic key, and the initial plaintext data for access by the first microprocessor function such that the second microprocessor function does not have access to the event credential, the cryptographic key, and the initial plaintext data;
wherein the first microprocessor function is adapted to encrypt the initial plaintext data using the cryptographic key according to the event credential to produce encrypted data;

wherein the second microprocessor function is adapted to receive an unlock signal via the electronic circuitry interface and to read the encrypted data via the cabling in response to the unlock signal;

wherein the electronic circuitry is adapted to store the encrypted data such that the encrypted data cannot be accessed by the second microprocessor function until the unlock signal is received, and to modify the encrypted data when an open circuit condition exists in the cabling; and wherein the second microprocessor function is adapted to provide the encrypted data via the electronic circuitry interface; and the container security system further comprising at least one portable computing device that is adapted to provide the event credential, the cryptographic key, and the initial plaintext data to the container security device via the electronic circuitry interface and to receive the encrypted data from the second microprocessor function via the electronic circuitry interface;

wherein the at least one portable computing device is adapted to decrypt the encrypted data using the cryptographic key according to the event credentials, to provide unlock plaintext data adapted to decouple the cabling.

2. The container security system of claim 1, further comprising the container latch.

3. The container security system of claim 1, wherein the portable computing device is adapted to compare the initial plaintext data with the unlock plaintext data to provide a comparison result, and to generate a validation signal if the comparison result is favorable.

4. The container security system of claim 3, wherein the container security device is adapted to receive the validation signal and to decouple the cabling from the housing only if the comparison result is favorable.

5. The container security system of claim 3, wherein the portable computing device includes visual indicia of the comparison result.

6. A method of providing container security, comprising:
closing a container using a latch device;
providing electronic circuitry disposed within a housing, wherein the electronic circuitry includes first and second microprocessor functions and an interface for accepting and providing data;
providing cabling that is removably coupled to the housing, provides an only communicative coupling between the first microprocessor function and the second microprocessor function, and is adapted to be attached to the latch device so as to break the communicative coupling if the latch device is opened;
providing the electronic circuitry with an event credential, a cryptographic key, and initial plaintext data;
storing the event credential, the cryptographic key, and the initial plaintext data in the electronic circuitry for access by the the first microprocessor function such that the second microprocessor function does not have access to the event credential, the cryptographic key, and the initial plaintext data;
encrypting, by the first microprocessor function, the initial plaintext data using the cryptographic key according to the event credential, to produce encrypted data;
providing an unlock signal to the second microprocessor function via the electronic circuitry interface and reading the encrypted data by the second microprocessor function via the cabling in response to the unlock signal;
storing the encrypted data by the electronic circuitry such that the encrypted data cannot be accessed by the second microprocessor function until the unlock signal is received, and modifying the encrypted data when an open circuit condition exits in the cabling;
providing the encrypted data, by the second microprocessor function via the electronic circuitry interface;
providing the event credential, the cryptographic key, and the initial plaintext data to the container security device by at least one portable computing device via the electronic circuitry interface and receiving the encrypted data from the second microprocessor function via the electronic circuitry interface; and
decrypting the encrypted data by the at least one portable computing device using the cryptographic key according to the event credentials, to provide unlock plaintext data adapted to decouple the cabling.

7. The method of claim 6, further comprising comparing the initial plaintext data with the unlock plaintext data by the portable computing device to provide a comparison result, and generating a validation signal if the comparison result is favorable.

8. The method of claim 7, further comprising receiving the validation signal by the electronic circuitry and decoupling the cabling from the housing only if the comparison result is favorable.

9. The method of claim 7, further comprising providing visual indicia of the comparison result.

* * * * *